(12) United States Patent
Fischburg

(10) Patent No.: US 6,895,389 B1
(45) Date of Patent: May 17, 2005

(54) INTERNET PROCUREMENT METHOD

(75) Inventor: Kenneth Alan Fischburg, Norwich, CT (US)

(73) Assignee: Consumers Interstate Corporation, Norwich, CT (US)

(*) Notice: Subject to any disclaimer, the term of this patent is extended or adjusted under 35 U.S.C. 154(b) by 489 days.

(21) Appl. No.: 09/656,330

(22) Filed: Sep. 6, 2000

(51) Int. Cl.[7] .............................................. G06F 17/60
(52) U.S. Cl. ...................................................... 705/26
(58) Field of Search ..................................... 705/26, 27

(56) References Cited

U.S. PATENT DOCUMENTS

| | | | | |
|---|---|---|---|---|
| 5,799,157 A | * | 8/1998 | Escallon ....................... | 705/27 |
| 5,897,622 A | * | 4/1999 | Blinn et al. ................... | 705/26 |
| 5,974,418 A | * | 10/1999 | Blinn et al. ................... | 705/26 |
| 6,058,373 A | * | 5/2000 | Blinn et al. ................... | 705/26 |
| 6,125,352 A | * | 9/2000 | Franklin et al. ............... | 705/26 |
| 6,606,744 B1 | * | 8/2003 | Mikurak ....................... | 705/26 |

FOREIGN PATENT DOCUMENTS

| | | | | |
|---|---|---|---|---|
| EP | 0 770 967 A2 | * | 5/1997 | ........... G06F/17/60 |

OTHER PUBLICATIONS

"New on–line resource for medical/surgical devices", Biomedical Safty & Standards, Mar. 1, 2000, vol. 30, Iss. 4, p. 29.*

* cited by examiner

*Primary Examiner*—Jeffrey A. Smith
(74) *Attorney, Agent, or Firm*—McCormick, Paulding & Huber LLP

(57) ABSTRACT

A method for ordering goods through the Internet is presented. The method comprises determining the user's specific procurement process, e.g., by an inventory of the user's facility, by an audit of the user's procurement records and/or by querying the user's personnel involved with the procurement process. Once the procurement process is determined, data indicative of the procurement process is input into a content database. A web site is hosted, which is operative with the computer program and the content database, the web site being accessible via the internet through a communications device. An electronic order form is stored in the memory, the order form being unique to the user, and operative with the computer program and the content database, such that the order form lists goods that meet the requirements of the identified procurement process of the user.

18 Claims, 5 Drawing Sheets

INTERNET PROCUREMENT METHOD

FIELD OF THE INVENTION

The present invention relates generally to an Internet procurement method and apparatus. More specifically, the present invention relates to a method and apparatus for procuring goods utilizing Internet based procurement forms customized to a user's procurement process requirements by procurement information input into a content database.

BACKGROUND OF THE INVENTION

Corporations and other organizations generally employ purchasing agents to procure supplies, such as paper and janitorial products. Often these supplies are procured from several different vendors and by several different purchasing agents. For example, an organization with facilities in different locations may have a purchasing agent in each locale buying products from different vendors at different prices. This can result in the payment of disparate amounts for the same items, or the loss of quantity discounts because the different purchasing agents did not realize that they were each buying the same goods.

In addition to paying different prices for the same products, purchasing agents often order quantities of particular products on a regular basis without regard as to changes in the usage of that product. This can result in an over abundance, or conversely, a shortage of the product. Moreover, personnel responsible for procurement may not be aware of alternative products directed to the same purpose but being sold at a reduced price.

The procurement process required by a corporation or other organization needed to meet the organization's total procurement requirements must address such issues as:

- goods and services to be purchased;
- the frequency of usage of the goods;
- the number of suppliers;
- shipping costs and miscellaneous costs;
- changing requirements and specifications;
- new and updated requirements and goods;
- costs of the goods;
- number of invoices received;
- number of purchase orders issued;
- number of checks sent out;
- number of requisitions reviewed; and
- number of items received at the dock.

Often management is unaware of the number of personnel involved throughout the organization to meet these issues. This can lead to an inefficient procurement process with an inordinate number of steps involved.

In general, to order supplies for an organization, a purchasing agent manually produces a purchase order form indicating what is being acquired and from whom. This form is reviewed and approved by the agent's supervisor, and then forwarded to the appropriate vendor. This can be time consuming and generates a great deal of paperwork.

Another difficulty sometimes encountered occurs where different products for the same purpose are ordered by different agents from different vendors without the supervisor realizing it. This can result in increased cost and inventory. Accordingly, there is a current need whereby a supervisor can specify products to be purchased and is alerted when an attempt is made to substitute a different product. In addition, the system should apprise the supervisor as well as the agent, concerning, quantities ordered to date, and quantities ordered in the past.

Another problem associated with purchasing departments is that it is difficult and time consuming to maintain current accounts receivable summaries, order histories and procurement requirements. Yet another difficulty occurs when a purchasing agent is not aware, or made aware that a particular product is in short supply and should be reordered. This can result in an organization being bereft of the item at a time when it is needed.

Recently, the advent of e-commerce has made purchasing via the internet popular. To accomplish this, a prospective buyer (user) accesses a web site and selects from the products offered by the host of that site. The site does not typically provide the user with historical data on past purchases, nor does the site restrict the user to purchasing only preferred items. Moreover, a prospective user has no control over any customization of a web site. This is because web sites are not based on the user's total procurement requirements identified at the prospective user's facility, e.g., by an inventory of the user's facility, by an audit of the user's procurement records or by querying the user's personnel involved with the procurement process.

Based on the foregoing, it is the general object of the present invention to provide an ordering method that overcomes the difficulties and drawbacks of prior art systems.

It is a more specific object of the present invention to provide a product ordering method that is electronic in nature, accessible via the internet, and is customizable to the unique needs of a particular user's procurement process.

SUMMARY OF THE INVENTION

The present invention offers advantages and alternatives over the prior art by providing a method for procurement of goods utilizing a content database, that can be accessed through a web site on the Internet, to provide a customized order form geared to the specific procurement process of an individual user. The procurement process can be determined by an inventory of the user's facility, by an audit of the user's procurement records and/or by querying the user's personnel involved with the procurement process. Once the procurement process of a user has been determined, a flow chart of the steps involved in the user's procurement process can be developed and streamlined. The database can present information to the user in a variety of formats to better enable the user to keep up with the changing dynamics of the market place than in previous prior art procurement systems.

These and other advantages are accomplished in an exemplary embodiment of the invention by providing a method for ordering goods in a processor based system having a memory with an executable computer program stored therein. The method comprises determining the user's specific procurement process. Once the procurement process is determined, data indicative of the procurement process is input into a content database. A web site is hosted, which is operative with the computer program and the content database, the web site being accessible via the internet through a communications device. An electronic order form is stored in the memory, the order form being unique to the user, and operative with the computer program and the content database, such that the order form lists goods that meet the requirements of the identified procurement process of the user. A security protocol is used for identifying the user in response to the user accessing the web site by providing identification signals thereto unique to the user, the identification signals cooperating with the security protocol. The electronic order form is displayed as a web page on the web site in response to the identification signals identifying the user. Order signals are received from the user through the communications device indicative of filling in an order on the order form, and the order is processed.

In an alternative embodiment of the invention the procurement process is determined by inventorying a facility of the user, auditing the user's procurement records and/or querying the user's personnel involved with the procurement process.

In another alternative embodiment of the invention a flow chart is developed of the steps involved in the user's procurement process. Moreover, unrequired steps in the procurement process revealed in the flow chart may be eliminated.

DETAILED DESCRIPTION OF THE PREFERRED EMBODIMENTS

The present invention is directed toward a method for procurement of goods utilizing order forms customized to a user's procurement process that can be accessed through a web site address of the Internet. Each user, e.g., companies or other organizations having purchasing agents, buyers or cost analysts, has an order form customized to the user's procurement process. The procurement process is determined by an inventory of the user's facility, by an audit of the user's procurement records and/or by querying the user's personnel involved with the procurement process. Once the procurement process of a user has been determined, a flow chart of the steps involved in the user's procurement process can be developed. Often the flow chart will reveal an inefficient process which includes many unrequited steps. Under these circumstances, a streamlined procurement process can be developed and flow charted by eliminating unrequired, e.g., redundant or unnecessary, steps. Data indicative of the user's procurement process (original or streamlined version) is than input into a content database to be later retrieved via a computer program and displayed on the customized order form at the web site. Links are provided to other web pages of the web site, which utilize the content database to present various other product specifications and information for the benefit of the user, including detailed side by side product comparisons between different products. Furthermore new product searches and current procurement data can be accessed from the same web site.

Figure 1:
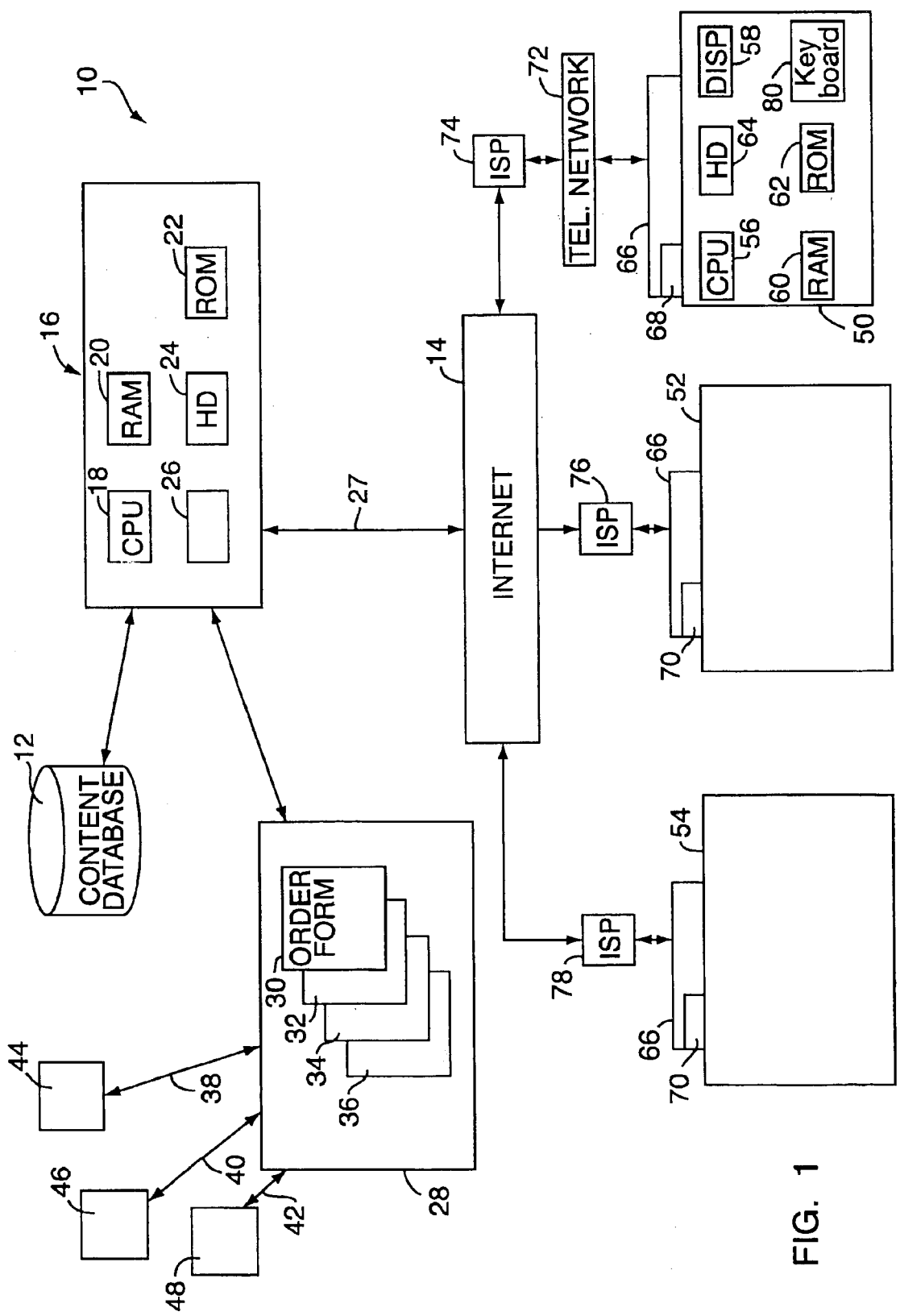
FIG. 1 is a schematic block diagram of an exemplary system for ordering goods utilizing a content based database that can be accessed through a web site address of the internet in accordance with the present invention.

Referring to FIG. 1, an exemplary embodiment of a system 10 for procuring goods utilizing a content database 12 accessed through the Internet 14 is shown. The system 10 includes a server computer 16 having a server central processing unit (CPU) 18; server memory that can include random access memory (RAM) 20, read only memory (ROM) 22 and a hard drive (HD) 24; and an electronic communication apparatus 26 for communicating, as indicated by reference number 27, with the Internet 14. As is understood by those of ordinary skill in the art, the Internet 14 is an interconnected network of computers that literally spans the globe, and that can include dedicated backbone transmission lines, satellite communication up-links and down-links, portions of the public telephone network, and various gateway and router computers and sophisticated switching apparatus.

The server computer 16 includes the content database 12 representative of information indicative of goods available for display to users, and also hosts a web site 28 that includes at least one order form web page 30 for user access using a standard browser. The term "goods" as used in this application includes, without limitation, such items as follows:

1) raw materials;
2) purchase parts;
3) processed materials such as machined or plated parts;
4) assemblies of parts and/or raw materials; and
5) maintenance, repair and operational (MRO) items, which include packaging, janitorial, food service, safety and maintenance items.

As will be described in greater detail hereinafter, the order form web page can be customized to a user's procurement process for each individual user accessing the web site 28 with information stored in the content database 12. The information would be obtained from methods such as inventorying a user's facility, auditing a user's procurement records, querying a user's personnel involved with procurement or any combination thereof.

By way of example, the order form will display a variety of goods relevant to the users specific product or production line. The user can simply fill in the order form and enter the order for all goods listed on the order form customized to the user's procurement process.

The order form web page 30 is linked to a plurality of other web pages 32, 34, 36, etc. to present user access to the content database 12 information in various customized venues. By way of example, web page 32 can present other product information and specifications of interest to a user, web page 34 can present information relevant to new products searches and web page 36 can present current user procurement data. Furthermore, the web site 28 provides links for communicating, as indicated by reference numbers 38, 40 and 42, with the other web sites 44, 46 and 48 respectively.

The system 10 also includes a plurality of user computers 50, 52, 54, etc. for providing the information from the web site 28 to the users (not shown). The user computers 50, 52 and 54 include a user computer central processing unit (CPU) 56; a display 58 for communication of the information to users; user computer memory that can include RAM 60, ROM 62, a hard drive 64; and an electronic communication apparatus 66 for communicating with server computer 16 using the Internet 14. The electronic communication apparatus can include a modem 68 or a local area network (LAN) 70. Typically, the user computer 50 uses the modem 68 and the public telephone network 72 to access the Internet 14 via an Internet Service Provider (ISP) 74. Alternatively, the user computers 52 and 54 can typically use the LANs 70 to access ISPs 76, 78 directly through such communication lines as television cable lines or phone lines for example. The user computers 50, 52 and 54 also include a user-input element 80 that includes one or more of a keyboard, mouse, light pen, or tablet and digitizer, for example. The user computers 50, 52 and 54 will typically be an IBM or Apple Personal Computer suitable for running a browser program and accessing the Internet 14.

As noted above, the computers 16, 50, 52 and 54 can include an electronic communication apparatus 26 and 66 respectively. The term "electronic communication apparatus", as used herein, refers to apparatus that facilitates electronic communication with another computer using a selected interconnection mechanism, such as the public telephone network, or the Internet, and a selected communication protocol, such as V.90 or V.32, or in the case of the Internet, TCP/IP. For example, an electronic communication apparatus can include a modem and/or a network card such as an Ethernet card for accessing a network that is in communication with other computers, such as over an intranet or the Internet 14. Electronic communication apparatus also includes circuitry that provides parallel, serial, Scsi, USB, Firewire and other such ports known in the art, and protocols such as Appletalk. The foregoing are merely examples of electronic communication apparatus.

According to the invention, the content database 12 of the server computer 16 aids the provision of information indicative of raw material, parts, supplies and services in the form of a customized order form to the user computers 50. 52 and 54 for display by the display 58. The content data base 12 can include information stored locally, that is, on the memory of the server computer 16, and can also include links or pointers to information available elsewhere, such as on other sites on the Internet 14.

Figure 2:
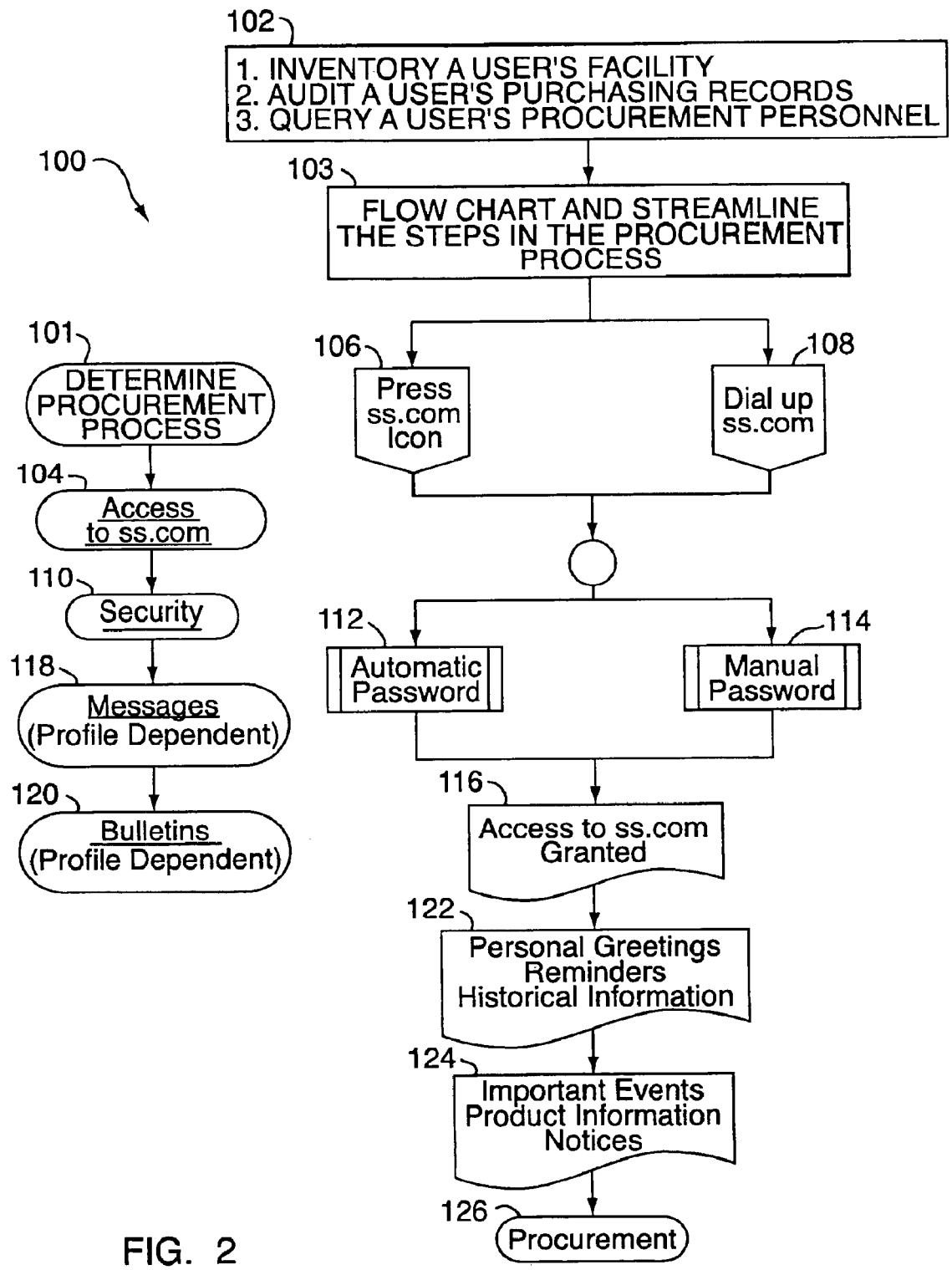
FIG. 2 is a schematic block diagram of an algorithm in which the system of FIG. 1 can operate.

Referring to FIG. 2, an exemplary algorithm 100, e.g., including a computer program, in which the system 10 can operate is illustrated. As indicated by block 101, each user must first determine their procurement process requirements, which will ultimately be input into the content database 12. Typically determining the procurement process requirements is done by an inventory, audit and query as indicated in block 102, of the user's facility. This can be conducted by, for example, the user or by a service provider of the database 12 and web site 28, e.g., a company selling the use of and maintaining the database and web site.

An inventory of the user's facility will determine the goods on hand at the time of the inventory. An audit of the user's procurement records will determine such items as: the frequency of use of the products and how often they are ordered, the unit cost of the items purchased, how many suppliers are being used, delivery times and shipping costs. By querying the personnel involved with the procurement process the number of steps used in purchasing an item can be determined.

Figure 4:
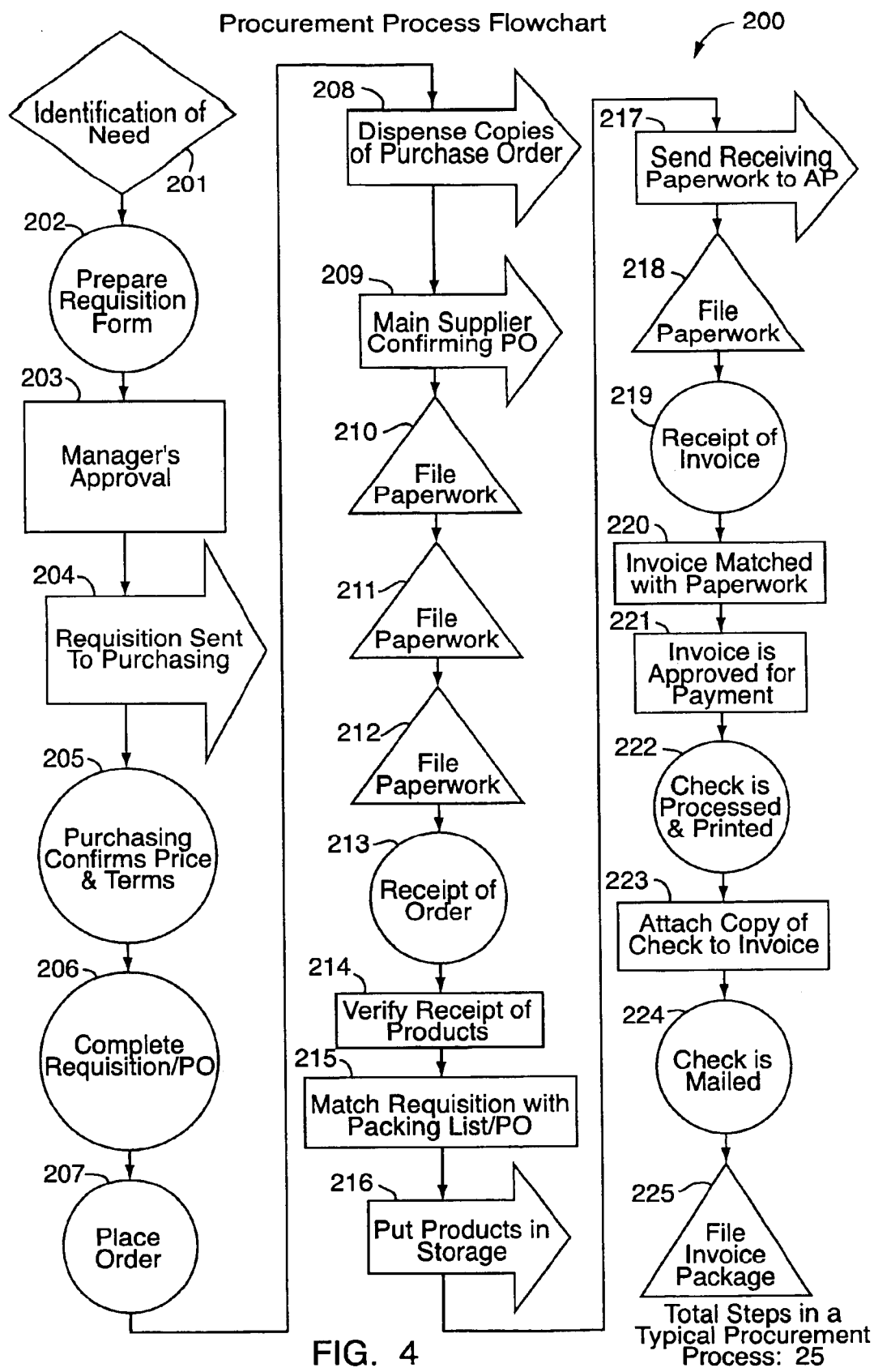
FIG. 4 is a flow chart of a user's determined procurement process in accordance with the present invention.
Figure 5:
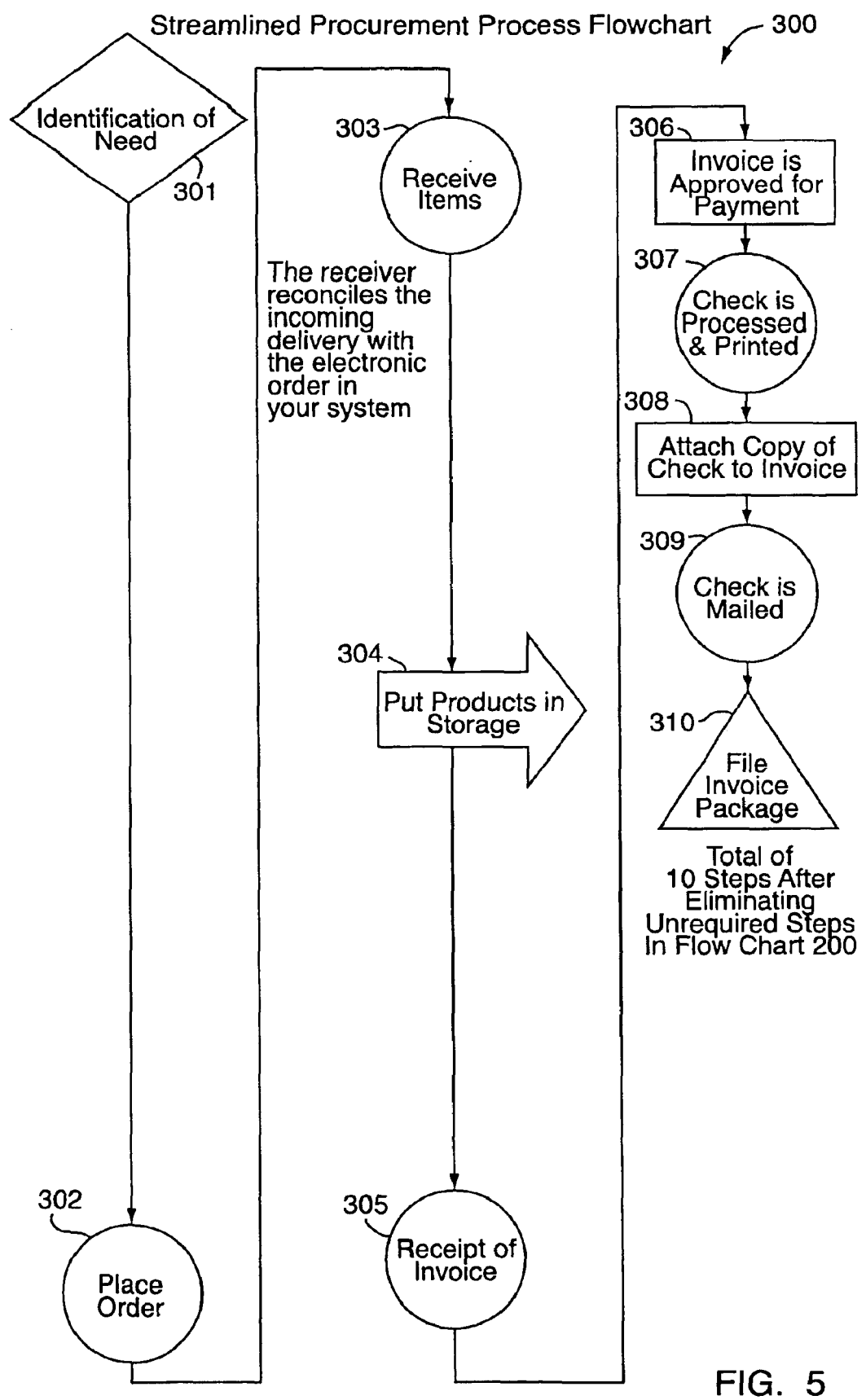
FIG. 5 is a streamlined version of the flow chart of FIG. 4 with any unrequired steps eliminated.

Proceeding to block 103 a flow chart of the steps of the procurement process can be developed from the above obtained information. By way of example, FIG. 4 depicts a typical Procurement Process Flowchart developed from the above analysis at 200. Flow chart 200 reveals a procurement process with twenty five (25) steps 201–225 involved. Often the flow chart 200 will reveal an inefficient process which includes many unrequited steps. Under these circumstances, a streamlined procurement process can be developed and flow charted by eliminated the unrequired steps revealed in flow chart 200. By way of example, FIG. 5 depicts a streamlined flow 300 with only ten (10) steps 301–310 required, which essentially perform the same function as flow chart 200. Data indicative of the finally determined (original or streamlined version) procurement process can than be input into the content data base to be utilized on a customized order form as discussed in greater detail hereinafter.

Proceeding to block 104 in FIG. 2, a user accesses the web site 28 of the server computer 16 via an appropriate computer program which typically comprises an Icon 106 that can be clicked on directly from the display screen 58 of a typical user computer 50 or through a dial up service 108 via a modem. Stepping to block 110, various security procedures may be implemented by the computer program to identify the user such as an automatic password procedure, block 112, or a manually entered password procedure, block 114. Once access to the web site 28 is granted, as indicated in block 116, the computer program may display various user profile dependent messages, block 118, and bulletins, block 120. The messages can take to form of personal greetings, reminders or historical information, as indicated in block 122. The bulletins may be such items as important events, product information or notices of specific interest to the particular user, as indicated in block 124. In accordance with the present invention the computer program next proceeds to the procurement section of the program as indicated in block 126.

Figure 3:
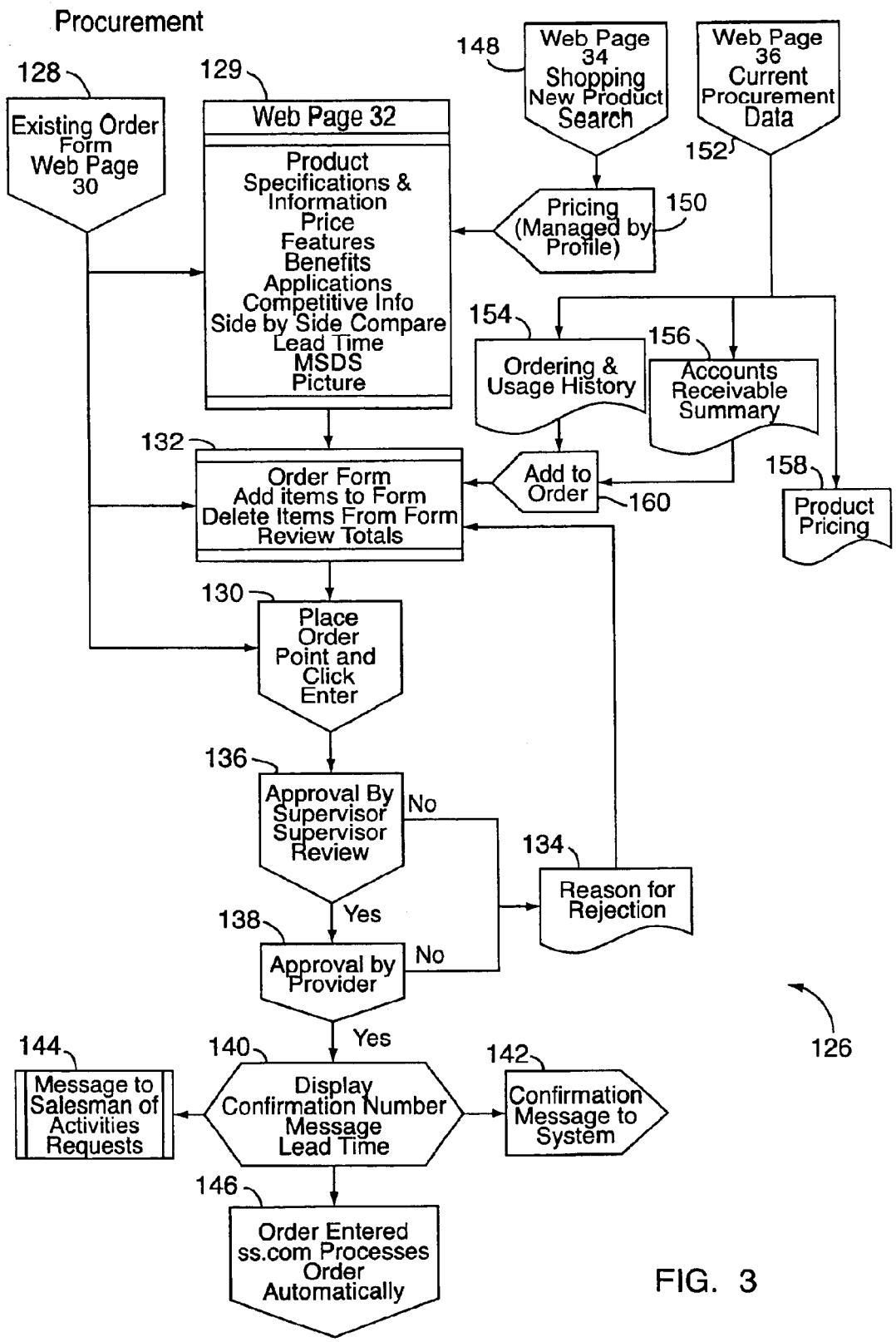
FIG. 3 is a schematic block diagram of the procurement procedure of the algorithm of FIG. 2.

Referring to FIG. 3, the procurement procedure 126 in accordance with the present invention is shown in detail. The program proceeds to block 128 where the order form web page 30 is displayed. The order form web page 30 is customized and matched to each user based on data obtained from the inventory, audit and query described in block 102 which was previously input into the content data base 12. The order form presents a complete list of goods to match the specific users procurement process as identified earlier.

The order form web page 30 provides access to the product specifications and information web page 32 where more detailed information is presented which can be made available to the user in a variety of formats, as indicated in block 129. The information on web page 32 is generated from the database 12 and may include, prices, features and benefits, application information, competitive information, side by side comparisons, lead times, material safety data sheets (MSDS), pictures and more.

A user need only fill out the order form 30 and place an order by pointing and clicking as indicated by block 130. Alternatively, the user can modify the parts list if required as shown in block 132. By way of example, the user can add or delete items from the order form 30, review the totals or send messages to the service provider. Based on such factors as a particular user's predetermined authorization status, the modification of the order form may be subject to supervisory review. If the modification is denied, the reasons for the rejection will be displayed, as illustrated by block 134.

Once an order is placed the program steps to block 136 where it is subject to a supervisory review. Reasons for rejection, e.g., the user has exceeded his monetary authority limit, are again displayed utilizing block 134. If supervisory approval is obtained, the order is then also subject to review by the service provider in block 138. Again reasons for rejection, e.g., the user's company has not paid its bills to the provider, will by displayed as indicated in block 134.

Upon approval by the provider, the program displays a confirmation message, including a confirmation number, as shown in block 140. A confirmation message with all pertinent details is automatically generated and sent to the user's system, shown in block 142, and any required messages to the user's salesmen of sales activities or requests associated with the order is also automatically sent, as indicated in block 144. The order is then entered and automatically processed for delivery to the user, as illustrated in block 146.

In an alternative embodiment, the user may choose to access the new product web page 34 to conduct a search for new or alternative products, as shown in block 148. Once a list of new products has been found, the program advances to block 150 where their pricing will be generated and displayed from the content database. The product information and specifications may also be viewed as shown in block 129 again.

In another embodiment, the user may choose to access the current procurement data web page 36, as indicated in block 152. This web page has access to data from the content database 12 that displays such items as user ordering and usage history, as shown in block 154, user product pricing, illustrated in block 156, and accounts receivable data and summaries, as indicated in block 158. From the current procurement data accessed from web page 36, a user can make a more informed decision as to whether he or she would like to add other items to the order, as shown in block 160.

As noted above, an important feature of the present invention is the use of a content database 12, that can be accessed through a web site 28 on the Internet 14, to provide a customized order form 30 geared to the previously determined procurement process of an individual user, e.g., purchasing agents or companies. The foregoing is considered an advantage over prior art purchasing systems and results in a more efficient and economical system for providing procurement data to a user. Additionally, the database 12 can present information to the user in a variety of formats, e.g., web pages 32, 34 and 36, to better enable the user to keep up with the changing dynamics of the market place than in previous prior art procurement systems.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A method for ordering goods in a processor based system having a memory with an executable computer program stored therein, the method comprising:

determining the user's specific procurement process including inventorying a facility of the user, auditing the user's procurement records, and querying the user's personnel involved with the procurement process;

inputting data indicative of the specific procurement process of the user into a content database;

hosting a web site operative with the computer program and the content database, the web site being accessible via the internet through a communications device;

storing an electronic order form in the memory, the order form being unique to the user, and operative with the computer program and the content database, such that the order form lists goods that meet the requirements of the specific procurement process of the user;

accessing the content database through the web site;

using a security protocol for identifying the user in response to the user accessing the web site by providing identification signals thereto unique to the user, the identification signals cooperating with the security protocol;

displaying the electronic order form unique to the user as a web page on the web site in response to the identification signals identifying the user;

receiving order signals from the user through the communications device indicative of filling in an order on the order form; and processing the order.

2. The method of claim 1 further comprising developing a flow chart of the steps involved in the user's procurement process.

3. The method of claim 2 further comprising eliminating unrequired steps in the procurement process revealed in the flow chart.

4. The method of claim 1 further comprising displaying a web page of the web site indicative of specifications and information of goods accessed from the database.

5. The method of claim 4 further comprising displaying a web page of the web site indicative of information on new goods accessed from the database based on a new goods search conducted by the user.

6. The method of claim 4 wherein the specifications and information of goods further comprises at least one of side by side comparisons of a plurality of goods, good prices, features of goods, benefits of goods, applications of goods, information on competitive goods, goods lead times, material safety data sheets of goods, pictures of goods and current procurement data.

7. The method of claim 6 wherein the current procurement data further comprises one of a history of ordering and usage, and an accounts receivable summary.

8. The method of claim 1 further comprising the user modifying the order form.

9. The method of claim 1 further comprising subjecting the order to review by a supervisor.

10. The method of claim 9 wherein the supervisor is one of a personnel of the user and a personnel of a provider of the web site.

11. The method of claim 1 further comprising displaying a confirmation message, including a confirmation number.

12. A method for ordering goods in a processor-based system having a memory with an executable computer program stored therein, the method comprising:

determining the user's specific procurement process by inventorying a facility of the user, auditing the user's procurement records and querying the user's personnel involved with the procurement process;

developing a flow chart of the steps involved in the user's procurement process;

eliminating unrequited steps in the procurement process revealed in the flow chart;

inputting data indicative of the procurement process of the user into a content database;

hosting a web site operative with the computer program and the content database, the web site being accessible via the internet through a communications device;

storing an electronic order form in the memory, the order form being unique to the user, and operative with the computer program and the content database, such that the order form lists goods that meet the requirements of the determined procurement process of the user;

using a security protocol for identifying the user in response to the user accessing the web site by providing identification signals thereto unique to the user, the identification signals cooperating with the security protocol;

displaying the electronic order form unique to the user as a web page on the web site in response to the identification signals identifying the user;

receiving order signals from the user through the communications device indicative of filling in an order on the order form; and processing the order.

13. The method of claim 12 further comprising displaying a web page of the web site indicative of specifications and information of goods accessed from the database.

14. The method of claim 13 further comprising displaying a web page of the web site indicative of information on new goods accessed from the database based on a new goods search conducted by the user.

15. The method of claim 12 further comprising subjecting the order to review by a supervisor.

16. In a computer network that includes a plurality of servers for accessing a plurality of web sites and a plurality of client systems, at least some of which include a display, input means, and a communications device each connected to and controlled by a processor, the communications device for connecting the client system to at least one of the servers, a method for ordering goods comprising the steps of:

establishing a connection between a processor of at least one of the client systems, and one of the servers;

accessing a particular one of the web sites causing the server to download to the connected processor of the client system a web page, from which a user can order a plurality of different goods, the web page being viewable on the display by a user;

customizing an order form, operative with the web site, to a particular procurement process of the user by inventorying a facility of the user, auditing the user's procurement records and querying the user's personnel involved with the procurement process to determine the user's procurement process;

using the input means to enter an identification protocol unique to the user, thereby causing the order form to be downloaded from the web site to the connected processor, and be viewable on the display;

using the input means to electronically fill in the customized order form, identifying goods to be purchased; and causing the processor of the connected client system to submit the electronically filled in order form to the server.

17. The method of claim 16 herein customizing the order form further comprises:

developing a flow chart of the steps involved in the user's procurement process; and eliminating unrequited steps in the procurement process revealed in the flow chart.

18. The method of claim 16 wherein customizing the order form further comprises:

inputting data indicative of the procurement process into a content database; and listing a portion of the goods contained in the content database and indicative of the procurement process on the order form.

* * * * *

UNITED STATES PATENT AND TRADEMARK OFFICE
CERTIFICATE OF CORRECTION

PATENT NO. : 6,895,389 B1
DATED : May 17, 2005
INVENTOR(S) : Kenneth A. Fischburg It is certified that error appears in the above-identified patent and that said Letters Patent is hereby corrected as shown below:

Column 8,
Line 42, "unrequited" should read -- unrequired --.

Column 10,
Line 17, "unrequited" should read -- unrequired --.

Signed and Sealed this

Twelfth Day of July, 2005

JON W. DUDAS
*Director of the United States Patent and Trademark Office*

INTER PARTES REEXAMINATION CERTIFICATE (864th)

United States Patent
Fischburg

(10) Number: US 6,895,389 C1
(45) Certificate Issued: Apr. 24, 2014

(54) INTERNET PROCUREMENT METHOD

(75) Inventor: Kenneth Alan Fischburg, Norwich, CT (US)

(73) Assignee: Consumers Interstate Corporation, Norwich, CT (US)

Reexamination Request:
No. 95/001,612, Apr. 28, 2011

Reexamination Certificate for:
Patent No.: 6,895,389
Issued: May 17, 2005
Appl. No.: 09/656,330
Filed: Sep. 6, 2000

Certificate of Correction issued Jul. 12, 2005

(51) Int. Cl.
*G06Q 10/00* (2012.01)
*G06Q 30/00* (2012.01)
(52) U.S. Cl.
USPC ...................................... 705/26.81; 705/27.1
(58) Field of Classification Search
None
See application file for complete search history.

(56) References Cited

To view the complete listing of prior art documents cited during the proceeding for Reexamination Control Number 95/001,612, please refer to the USPTO's public Patent Application Information Retrieval (PAIR) system under the Display References tab.

*Primary Examiner* — B. James Peikari

(57) ABSTRACT

A method for ordering goods through the Internet is presented. The method comprises determining the user's specific procurement process, e.g., by an inventory of the user's facility, by an audit of the user's procurement records and/or by querying the user's personnel involved with the procurement process. Once the procurement process is determined, data indicative of the procurement process is input into a content database. A web site is hosted, which is operative with the computer program and the content database, the web site being accessible via the internet through a communications device. An electronic order form is stored in the memory, the order form being unique to the user, and operative with the computer program and the content database, such that the order form lists goods that meet the requirements of the identified procurement process of the user.

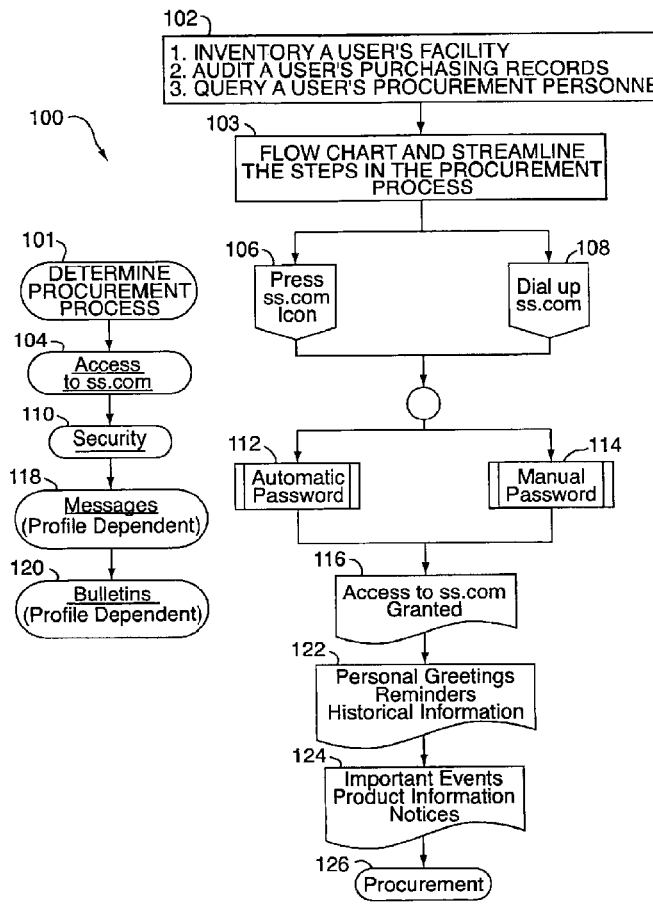

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-18 are cancelled.

\* \* \* \* \*